(12) United States Patent
Hazzard et al.

(10) Patent No.: US 6,993,904 B2
(45) Date of Patent: Feb. 7, 2006

(54) INTEGRATED VALVE SYSTEM

(75) Inventors: Frederick R. Hazzard, Shakopee, MN (US); Sutanto Thomas, Eden Prairie, MN (US)

(73) Assignee: Eaton Corporation, Cleveland, OH (US)

( * ) Notice: Subject to any disclaimer, the term of this patent is extended or adjusted under 35 U.S.C. 154(b) by 78 days.

(21) Appl. No.: 10/839,852

(22) Filed: May 6, 2004

(65) Prior Publication Data

US 2005/0247189 A1 Nov. 10, 2005

(51) Int. Cl.
*F16D 31/02* (2006.01)
(52) U.S. Cl. .......................... 60/452; 60/464
(58) Field of Classification Search ................. 60/452, 60/464
See application file for complete search history.

(56) References Cited

U.S. PATENT DOCUMENTS 4,617,797 A 10/1986 Williams ..................... 60/452
4,936,095 A 6/1990 Ross et al.

*Primary Examiner*—F. Daniel Lopez
(74) *Attorney, Agent, or Firm*—L. J. Kasper

(57) ABSTRACT

An integrated valve system (51) for use with a variable displacement hydrostatic pump (11), including a relief and check valve assembly (75) and a pressure override (POR) section, operable to communicate pressure above a predetermined POR setting from the high pressure side (15) of the HST closed loop to a stroking cylinder (29) to destroke the pump (11). A high pressure relief spring (83) determines the relief setting, and a POR compression spring (109) determines the POR setting, the relief spring and the POR spring being seated independently of each other, such that the POR setting may be adjusted without effecting the operation of the relief and check valve assembly (75).

7 Claims, 4 Drawing Sheets

INTEGRATED VALVE SYSTEM

BACKGROUND OF THE DISCLOSURE

The present invention relates to hydrostatic transmission ("HST") systems and controls therefore, and more particularly, to closed loop hydrostatic transmission systems including a charge pump which serves as the source of make-up fluid to the closed loop, and as the source of control fluid to the system controller.

A typical closed loop hydrostatic transmission system of the type to which the present invention relates is illustrated and described in U.S. Pat. No. 4,936,095, assigned to the assignee of the present invention and incorporated herein by reference. In such a closed loop HST system, the closed loop and the various system components are protected from excessive pressures by means of a pair of high pressure ("overpressure") relief valves, which are typically included in a valve assembly disposed in the pump endcover. As is well known in the art, one high pressure relief valve (HPRV) protects a first side of the closed loop (dumping to the second side when the first side exceeds the HPRV setting), and the other HPRV protects the second side of the closed loop (dumping to the first side when the second side exceeds the HPRV setting).

In the closed loop HST system sold commercially by the assignee of the present invention, there is provided a pair of valve assemblies, each of which includes one of the high pressure relief valves (HPRV's) mentioned previously. By way of background and explanation only, each of these valve assemblies would typically be disposed in a valve bore, and each bore would be in communication with three different locations of the closed loop HST system as follows: (1) the charge pump; (2) one of the servos by means of which the pump displacement is varied; and (3) one side of the closed loop (i.e., one of the conduits extending between the pump and the motor).

Typically, each of the valve assemblies includes, in addition to the high pressure relief valve, a check valve which prevents backflow from the adjacent portion of the hydrostatic closed loop (when it contains high pressure) to the charge pump, while permitting flow from the charge pump to the adjacent portion of the hydrostatic loop (when it contains low pressure). Each of the valve assemblies also would normally include a pressure override ("POR") valve, by means of which pressurized fluid may be communicated from the adjacent portion of the hydrostatic loop (when it contains high pressure) to the associated servo, thereby reducing pump displacement, whenever the pressure in the hydrostatic loop has exceeded the POR setting.

In addition, the typical closed loop HST system includes a bypass valve assembly which is capable of "crossporting" (or short circuiting) the hydrostatic closed loop. One of the primary uses of the bypass valve assembly arises whenever the vehicle is disabled and must be moved (such as by being towed) some distance. The bypass valve assembly usually functions by means of some sort of manual actuation by the vehicle operator to lift the check valves (of both of the valve assemblies) off of their respective check valve seats, thus allowing oil to flow freely from one side of the hydrostatic closed loop to the other side (i.e., from the "A" port to the "B" port, or vice versa). In the condition described, the motor which normally drives a vehicle drive wheel is then able to turn freely as the vehicle is being towed, without causing the fluid to overheat.

It is, of course, desirable to combine all of the various functions described above into one integrated valve assembly in order to reduce the size and complexity and expense of the pump end cover, or whatever portion of the pump housing contains the valve assemblies. An example of a prior art valve assembly including all of the functions described above, is illustrated and described in U.S. Pat. No. 4,617,797, incorporated herein by reference. In the "multi-function valve" of the above-cited patent, the POR valve portion of the multi-function valve serves as a "pilot" for the high pressure relief valve ("HPRV") portion. Therefore, although each of the individual functions of the multi-function valve of the above-cited patent has been generally satisfactory in operation, it has been observed that one major disadvantage of this prior art device is that, because the POR valve serves as the pilot for the HPRV, the fluid pressure at which the HPRV opens and begins to relieve pressure is always a constant differential pressure (for example, 500 psi) higher than the POR setting.

Any adjustment (such as by the vehicle operator) of the POR setting will change the HPRV setting accordingly, and excessive adjustment of the POR setting can result in loss of the pilot flow which is required to actuate the HPRV. Finally, in the multi-function valve of the above-cited patent, the POR function requires an increasing pump output pressure in order to generate an increasing rate of flow to destroke the pump, which those skilled in the art will understand to be counter-productive.

BRIEF SUMMARY OF THE INVENTION

Accordingly, it is an object of the present invention to provide an improved integrated valve system (i.e., one which performs a number of functions), in which the setting of the high pressure relief valve portion is independent from the setting of the pressure override valve portion, and manual adjustment of the POR setting will not effect the HPRV function.

It is a more specific object of the present invention to provide an improved integrated valve system in which the valve system is arranged such that the POR valve portion is not a pilot section for the HPRV portion, as is the case in the prior art described previously.

It is a further object of the present invention to provide an improved integrated valve system in which the operation of the bypass portion of the valve system does not effect operation of the HPRV portion.

Finally, it is an object of the present invention to provide an improved integrated valve system in which the POR function has a relatively "flat" relationship of pressure vs. flow, i.e., in which there is not required an increasing pump pressure to generate an increasing flow to destroke.

The above and other objects of the invention are accomplished by the provision of an improved variable displacement hydrostatic pump, including a housing, and adapted to supply pressurized fluid to a high pressure conduit in fluid communication with an outlet of the pump. A source of relatively low pressure make-up fluid is adapted for fluid communication with a low pressure conduit in fluid communication with an inlet of the pump. A fluid pressure operated means to vary the displacement of the pump is included, and an integrated valve system is disposed in a bore in the housing. The bore is in open fluid communication with the source of low pressure at a first location defining a poppet seat, and with the fluid pressure operated means at a second location, and with the high pressure conduit at a third location, intermediate the first and second locations. The integrated valve system includes a relief and check valve subassembly including a check valve poppet, normally seated against the poppet seat at the first location. A pressure override (POR) valve member is operable in response to a pressure in the pressure conduit in excess of a predetermined POR setting to communicate fluid from the third location to the second location. A bypass actuator is disposed at least partly external to the housing and is operable, in response to manual actuation thereof, to move the check valve poppet away from the poppet seat and permit unrestricted fluid communication from the third location to the first location.

The improved variable displacement hydrostatic pump is characterized by the bypass actuator including an elongated portion disposed between the relief and check valve subassembly and a manual actuation portion disposed external to the housing, whereby axial movement of the manual actuation portion results in corresponding axial movement of the relief and check valve subassembly. The integrated valve system further includes a housing member fixed within the bore and defining a POR port operable to permit fluid communication from the third location to the second location. The POR valve member is disposed adjacent the elongated portion of the bypass actuator, the POR valve member being biased toward a normally-closed position blocking flow from the third location, through the POR port, to the second location. The POR valve member is operable to open in response to fluid pressure at the third location exceeding the POR setting, biasing the POR valve member toward an open position permitting fluid flow from the third location through the POR port to the second location.

DETAILED DESCRIPTION OF THE PREFERRED EMBODIMENT

Figure 1:
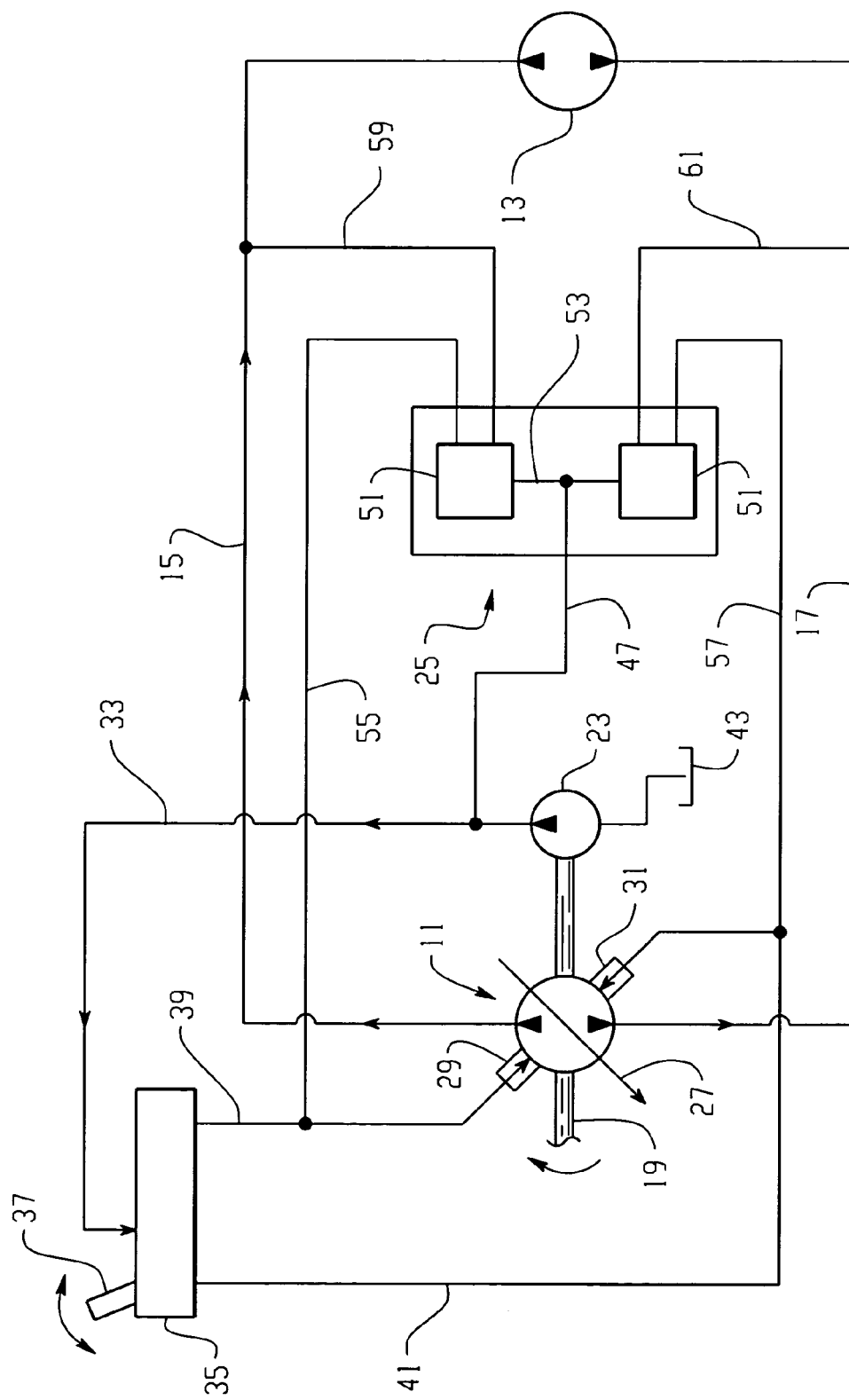
FIG. 1 is a fragmentary, hydraulic schematic of a somewhat simplified version of a closed loop hydrostatic transmission and control system of the general type to which the present invention relates, including the installation of, and the various connections of, the integrated valve assembly of the present invention.

Referring now to the drawings, which are not intended to limit the invention, FIG. 1 illustrates a typical closed-loop hydrostatic transmission (HST) system of the type to which the present invention relates. The HST system of FIG. 1 includes, by way of example only, a variable displacement axial piston pump, generally designated 11, which is hydraulically coupled to a fixed displacement, axial piston motor 13 by means of a pair of fluid conduits 15 and 17. The pump 11 may be of a well-known type, including an input shaft 19, which drives the rotating group of the pump 11, and also drives a charge pump 23, all in a manner well known to those skilled in the art. Typically, the output of the charge pump is the sole source for make-up fluid to either fluid conduit 15, or fluid conduit 17, whichever may, at any given moment in time, contain fluid at a pressure below the output pressure of the charge pump 23. As is conventional in the art, the output pressure of the charge pump 23 (which pressure is also frequently referred to as "control pressure" is typically selected to be in the range of about 150 psi to about 350 psi (i.e., the setting of a low pressure relief valve, not shown herein). Communication of make-up fluid from the charge pump 23 to either of the fluid conduits 15 or 17 is through an integrated valve assembly (or integrated valve system "IVS"), generally designated 25, which will be described in greater detail subsequently.

The pump 11 further includes a swashplate 27 which is pivotable, to vary the displacement (fluid output volume per revolution of the input shaft 19) of the pump 11, by means of a pair of stroking cylinders 29 and 31, as is generally well known in the art. The motor 13 would typically include an output shaft (not shown herein) which would be connected to drive a load such as a driven wheel used to propel the vehicle on which the HST system is located, and is operational.

The output of the charge pump 23, in addition to being directed to one of the fluid conduits 15 or 17 (whichever needs make-up fluid), is also communicated by means of a conduit 33 to a main controller, generally designated 35. It should be understood by those skilled in the art that, for purposes of the present invention, the main controller 35 may be any one of the conventional, well-known mechanisms by means of which movement of a control handle 37 (or some other suitable "input") is able to communicate the "control pressure" in the conduit 33 to either a conduit 39 or a conduit 41. As may be seen in FIG. 1, and as is well known in the art, the conduit 39 is connected to the stroking cylinder 29, whereas the conduit 41 is connected to the stroking cylinder 31. Thus, movement of the control handle 37 from a neutral position in either a "forward" (i.e., selecting forward movement of the vehicle) or "reverse" direction communicates control pressure to either the conduit 39 or 41, to displace the swashplate 27 toward either a forward or reverse direction, respectively, to communicate pressurized fluid from the pump 11 to either the fluid conduit 15 or the fluid conduit 17, respectively. In the subject embodiment, and by way of example only, when the fluid conduit 15 contains high pressure, the motor 13 is driven in a direction to propel the vehicle in a forward direction, and when the fluid conduit 17 contains high pressure, the motor 13 is driven in a direction to propel the vehicle in a reverse direction.

The HST system illustrated in FIG. 1 is of the type referred to as a "closed-loop" system primarily because, assuming forward direction of operation, the fluid conduit 15 communicates high pressure fluid from the outlet of the pump 11 to the inlet of the motor 13, and the fluid conduit 17 communicates low pressure, return fluid from the outlet of the motor 13 to the inlet of the pump 11. The system also includes a fluid reservoir 43, but in a closed-loop system, only leakage fluid (such as from the case of the pump 11 or from the case of the motor 13) is communicated to the fluid reservoir 43. The fluid output of the charge pump 23 (make-up fluid) thus makes up for any leakage lost from the system to the fluid reservoir 43.

Referring still primarily to FIG. 1, but now also to FIG. 2, the valve assembly 25 will be described in detail. In the subject embodiment, and by way of example only, the valve assembly 25 is disposed in an end cover 45 of the pump 11, although shown schematically in FIG. 1 as being separate from the pump 11, for ease of illustration. The outlet flow from the charge pump 23 is communicated by means of a conduit 47 into the valve assembly 25, in which is disposed a pair of substantially identical integrated valve systems ("IVS"), each of which is designated 51, and which are shown schematically in FIG. 1 as being arranged in a "mirror-image" relative to each other. Thus, the conduit 47 communicates with a charge cavity 53. The upper IVS 51 has a conduit 55 in communication with the conduit 39 connected to the stroking cylinder 29. In a similar manner, the lower IVS 51 has a conduit 57 in communication with the conduit 41 which communicates with the stroking cylinder 31.

Finally, the upper IVS 51 has a conduit 59 in fluid communication with the fluid conduit 15 of the HST closed-loop, while the lower IVS 51 has a conduit 61 in fluid communication the fluid conduit 17 (the "B" side of the HST closed-loop). It is believed that, because the two integrated valve systems 51 may be substantially identical, and in view of the schematic representation of FIG. 1, the present invention may be fully understood by describing, in detail, the upper IVS 51, in conjunction with a description of FIG. 2.

Figure 2:
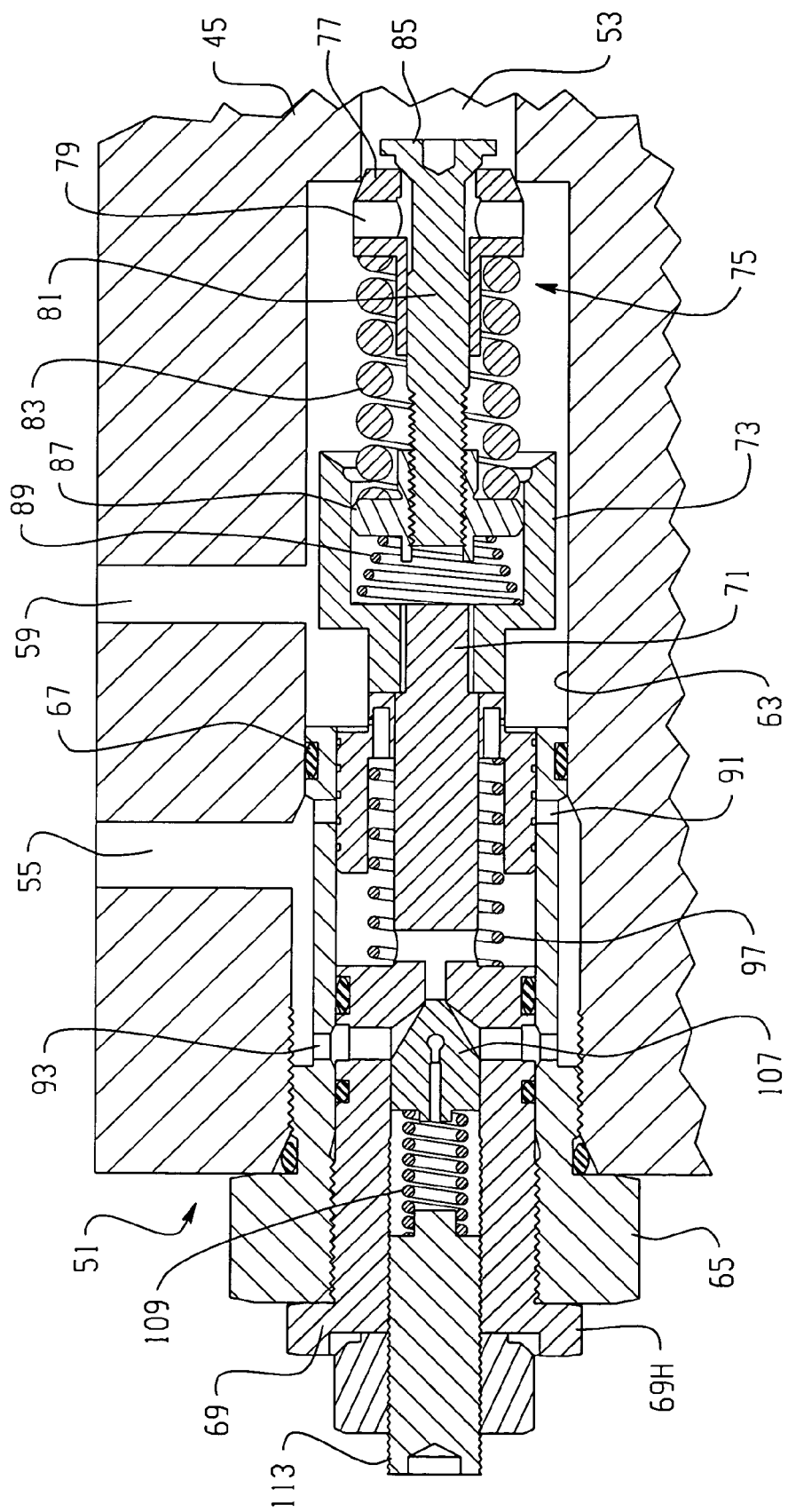
FIG. 2 is an enlarged, fragmentary, axial cross-section of one of the integrated valve assemblies, represented schematically in FIG. 1, in its normal position.

Referring now primarily to FIG. 2, it may be seen that the charge cavity 53 is in open communication (if the IVS 51 were removed) with a stepped bore 63 defined by the end cover 45 of the pump 11, the junction of the charge cavity 53 and the stepped bore 63 being referred to hereinafter, and in the appended claims, as a "first location". The conduit 55, which is in communication with the stroking cylinder 29, is in open communication with the stepped bore 53 at what is referred to as a "second location". Finally, the conduit 59, which is in fluid communication with the fluid conduit 15 (the "A" side of the closed loop), is in open communication with the stepped bore 63 at what will be referred to as a "third location" which, in the subject embodiment, is disposed intermediate the first and second locations for reasons which will become apparent subsequently.

Disposed with the stepped bore 63, and in threaded engagement therewith, is a threaded housing member 65 which preferably includes, at its forward end (right end in FIG. 2) a seal member 67, thus sealing and separating the conduit 55 from the conduit 59. Disposed within the housing member 65, and in threaded engagement therewith, is a valve body 69 which includes an elongated portion 71, extending to the right in FIG. 2, and being in threaded engagement with a set of internal threads defined by a relief valve insert 73. As will be explained in greater detail subsequently, the valve body 69 comprises part of a bypass actuator. Disposed within and to the right of the relief valve insert 73 is a relief and check valve assembly, generally designated 75, which may be made substantially as shown in above-incorporated U.S. Pat. No. 4,936,095. However, it should be noted that the construction features and details shown in the incorporated patent are not essential to the present invention, except to the extent specifically recited hereinafter in the appended claims.

Referring still primarily to FIG. 2, the relief and check valve assembly 75 includes a seat member 77, which also serves as a "check valve poppet" as will be described further subsequently. The seat member 77 defines a plurality of radial passages 79 providing communication from the region within the stepped bore 63 to the interior of the seat member 77. Disposed within the seat member 77 is a poppet assembly, including a poppet stem 81 surrounded by a helical compression spring 83. The poppet stem 81 extends axially through the interior of the seat member 77, defining an annular chamber therebetween (as is better shown in the above-incorporated patent), and it is this annular chamber into which the radial passages 79 open. Attached to the poppet stem 81 is a relief poppet 85, which is normally disposed against ("normally closed") a relief seat defined by the seat member 77, and projects axially somewhat into the charge cavity 53. Fixed to the left end (in FIG. 2) of the poppet stem 81 is a relatively large, circular washer member 87, against which the left end of the compression spring 83 is seated. Disposed within the relief valve insert 73 is a relatively light compression spring 89, which permits the entire assembly 75 to serve as a check valve, such that, if the pressure in the conduit 59 does not exceed that in the charge cavity 53 by at least the force of the spring 89, the fluid pressure in the charge cavity 53 will overcome the biasing force of the compression spring 89 and bias the seat member 77, the poppet stem 81, the spring 83, and the washer member 87, as a unit, to the left in FIG. 2. This movement will open up sufficient communication to permit make-up fluid to flow from the charge pump 23 through the charge cavity 53, through the stepped bore 63 to the conduit 59, i.e., from the "first location" to the "third location".

As is also well known to those skilled in the art, and from a reading and understanding of the above-incorporated patent, the spring rate of the compression spring 83 determines the relief setting of the assembly 75. For example, the spring 83 may be selected to provide a relief setting of 6,000 psi, such that, if the pressure in the fluid conduit 15 (and in the conduit 59) exceeds 6,000 psi, that pressure will also be present within the stepped bore 63 (to the right in FIG. 2 of the seal member 67). Pressurized fluid will flow through the radial passages 79, and exert a biasing force on the relief poppet 85, tending to bias it to the right in FIG. 2, moving the relief poppet 85, the poppet stem 81, and the washer member 87, as a unit. This rightward movement of the relief poppet 85 compresses the compression spring 83, which has its right end seated against the "rearward" surface of the seat member 77. Thus, the excessive pressure is able to flow from the conduit 59, past the relief poppet 85 into the charge cavity 53, from where it will unseat the check valve portion of the lower integrated valve system 51 and flow from there through the conduit 61 to the fluid conduit 17 (which at that time, would contain low pressure).

Figure 3:
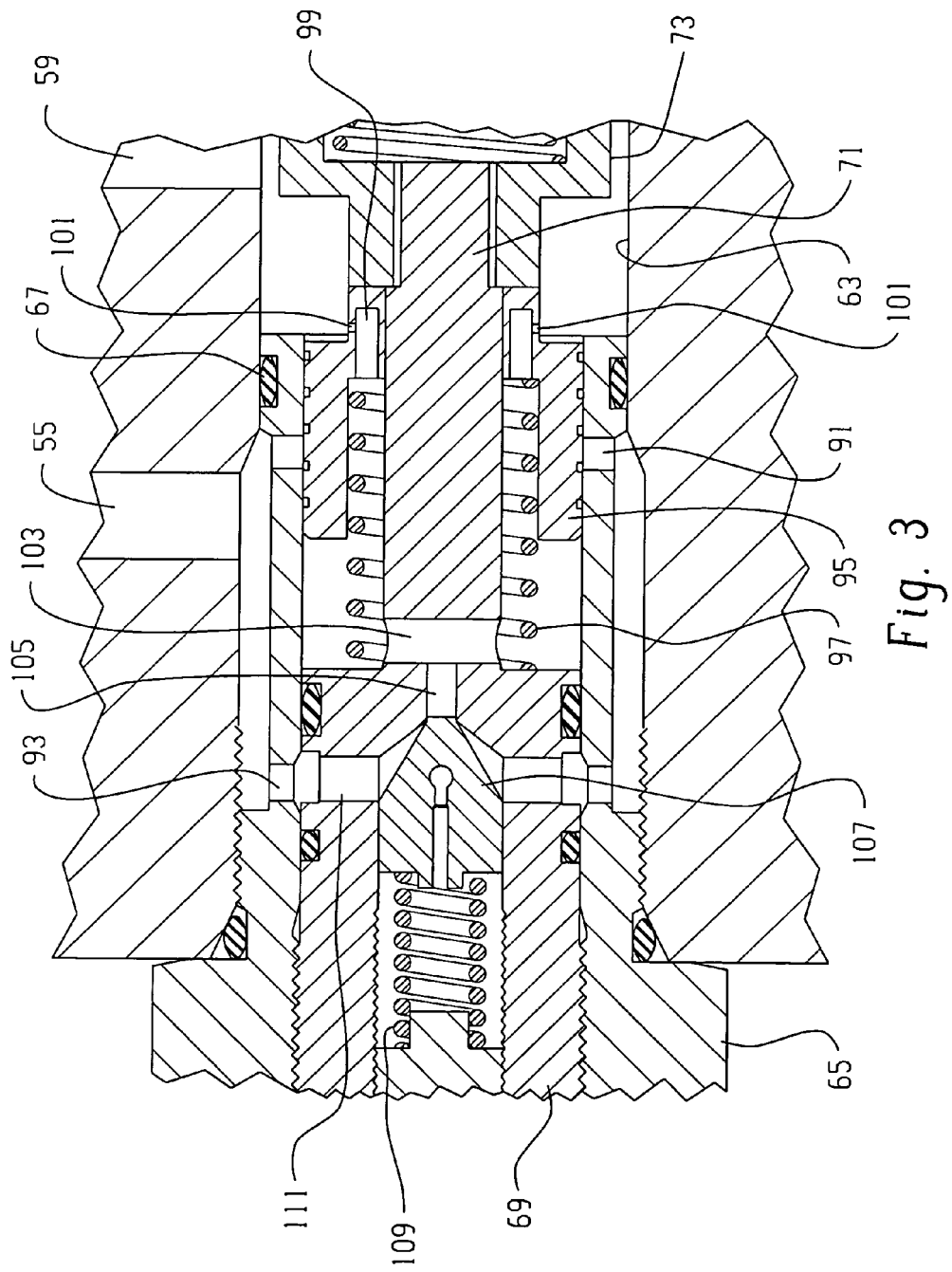
FIG. 3 is an enlarged, fragmentary, axial cross-section, similar to FIG. 2, illustrating in greater detail one important aspect of the present invention.

Referring now primarily to FIG. 3, it may be seen that the housing member 65 defines two sets of radial ports disposed within the cylindrical portion of the housing member 65, and located to be in fluid communication with the conduit 55. These ports include, starting from the right in FIG. 3, a set of pressure override (POR) ports 91, and a set of pilot drain ports 93. Disposed within the housing member 65, and surrounding the elongated portion 71 is a pressure override (POR) valve member 95, which is normally biased against the left end of the relief valve insert 73 by a compression spring 97. The POR valve member 95 defines a plurality of axial fluid passages 99, each of which is in open communication with the conduit 59 by means of a small radial orifice 101, for reasons which will become apparent subsequently.

The valve body 69 defines, at its junction with the elongated portion 71, a generally diametral fluid passage 103, and in communication therewith is an axial passage 105. Seated at the left end of the axial passage 105 is a pilot poppet 107, biased toward the closed position shown in FIG. 3 by means of a POR compression spring 109. If, by way of example only, it is desired to have the POR setting about 500 psi less than the HPRV setting, the POR compression spring 109 would be selected such that, if the fluid pressure in the conduit 59 (and in the fluid conduit 15) exceeds 5500 psi, that pressure would unseat the POR pilot poppet 107, overcoming the biasing force of the spring 109. In that condition, the fluid in the conduit 59 would flow through each of the small radial orifices 101, then through the respective axial passages 99, past the compression spring 97 and into the diametral fluid passage 103. Fluid in the passage 103 would then flow through the axial passage 105, past the unseated pilot poppet 107 and out through one or more radial bores 111 defined by the valve body 69. Fluid in the radial bores 111 would then flow through the pilot drain ports 93 and into the conduit 55.

With the very small amount of pilot flow occurring through the small radial orifices 101, there is now a substantial pressure differential across the POR valve member 95, sufficient to overcome the biasing force of the relatively light compression spring 97 and move the POR valve member 95 from its normally-closed position shown in FIG. 3 toward the left in FIG. 3, sufficient to open communication from the conduit 59, through the POR ports 91, and out the conduit 55. As is well known to those skilled in the art, the fluid conduit 15 is, at this moment, the high pressure side of the HST closed loop because the main controller 35 has communicated control pressure from the conduit 33 through the conduit 41 to the stroking cylinder 31, to establish a certain predetermined displacement of the swashplate 27. In this condition, the fluid pressure in the stroking cylinder 29 is substantially zero (reservoir pressure). Therefore, when the fluid pressure in the conduits 15 and 59 exceed the POR setting (5500 psi in our example), the flow of pressurized fluid from the conduit 59 through the POR ports 91 is communicated through the conduit 55 to the stroking cylinder 29, thus counteracting the control pressure communicated to the stroking cylinder 31, and decreasing the displacement of the swashplate 27.

It is one significant feature of the present invention that the POR section of the IVS 51 maintains the pressure in the conduits 15 and 59 at the POR setting, by varying the displacement of the pump 11, in the manner described. It should be noted that, although the POR section of the IVS 51 has been illustrated and described as being pilot operated, such is not essential to the practice of the present invention. For example, the POR valve member could simply comprise a poppet member disposed where the valve member 95 is shown, and seated against a poppet seat, defined by, for example, the right end of the housing member 65. However, those skilled in the art will recognize that there are certain performance advantages to having the POR valve member 95 be pilot operated.

Referring again to FIG. 2, in conjunction with FIG. 3, it may be seen that in accordance with one important aspect of the invention, whenever there is pilot flow through the orifices 101 and past the pilot poppet 107, resulting in movement of the POR valve member 95 to its open position, the operation of the pressure override portion of the integrated valve system 51 does not have any effect upon the function or performance of the rest of the IVS 51. That is in part because the relief compression spring 83 and the POR compression spring 109 are not "in series", but instead, are seated independently of each other. Therefore, by way of example, if the vehicle operator would rotate a POR calibration screw 113 (also referred to hereinafter as a "bypass actuator") either to increase the POR setting (i.e., the force of the POR spring 109 on the pilot poppet 107), or to decrease the POR setting, the HPRV setting and operation would not be effected. In either case, the HPRV setting would (in our example) remain at 6000 psi, and in view of the fact that, as is well known to those skilled in the art, it is the HPRV setting that ultimately provides the protection for the entire circuit and its components, it is a major advantage of the present invention that the vehicle operator can adjust the POR setting, but whatever the vehicle operator does to the POR setting will not change or effect the designed-in HPRV setting.

Referring still primarily to FIG. 2, but now in conjunction with FIG. 4, a further aspect of the present invention will be described. As mentioned previously, the valve body 69 is externally threaded and in FIG. 2, it is shown fully threaded in until the "head" (for example, a hex head 69H) of the valve body 69 is against the housing member 65. If the vehicle operator now wishes to utilize the "bypass" function of the integrated valve system 51, the operator would rotate the valve body 69 in a direction to unthread it relative to the housing member 65, thus moving the valve body 69 to the left in FIG. 2. In doing so, the elongated portion 71 also moves to the left (it is preferably formed as an integral part of the valve body 69), thus moving the entire relief and check valve assembly 75 to the left in FIG. 2 until the seat member 77 (which comprises the check valve poppet) moves away from a poppet seat 115, formed at the junction of the charge cavity 53 and the stepped bore 63 (see FIG. 4).

Figure 4:
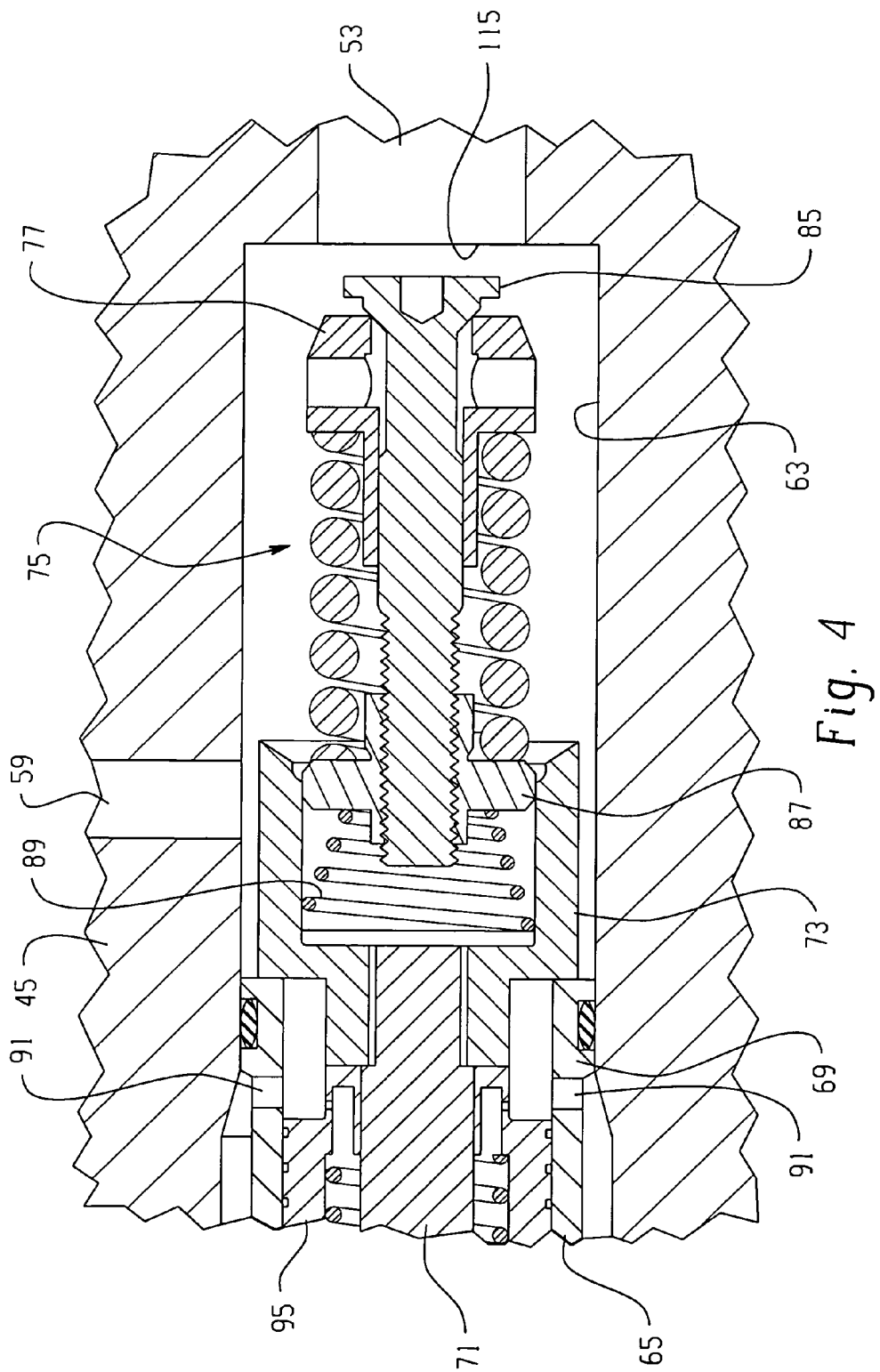
FIG. 4 is an enlarged, fragmentary, axial cross-section, similar to FIG. 2, illustrating the relief and check valve assembly, operating in the bypass mode.

Preferably, and as is shown only in FIG. 4, the vehicle operator, in utilizing the bypass function, will unthread the valve body 69 until the relief valve insert 73 engages the right hand end of the housing member 65, i.e., the position shown in FIG. 4. Thus, when the relief valve insert 73 engages the right end of the valve body 69, that engagement serves as a "stop" for the operation of the bypass function. As is well known to those skilled in the HST art, the vehicle operator will perform the same process of unthreading the valve body 69 on both of the integrated valve systems 51, such that each will be in the condition shown in FIG. 4. In that condition, and as is already well known, the vehicle may be towed, which causes the driven wheels to rotate, thus causing the motor 13 to be driven or rotated. In such a towing mode (which is intended to occur over only a very short distance), the motor 13 effectively becomes a "pump" and circulates fluid from its outlet through the fluid conduit 17, then through the conduit 61, through the charge cavity 53 and out the conduit 59 to the fluid conduit 15 and back to the inlet of the motor 13. With the relief and check valve assemblies 75 of the two integrated valve systems 51 in the position shown in FIG. 4, the flow described above can occur with relatively little restriction to fluid flow, and therefore, with relatively little heating of the fluid occurring.

Thus, it may be seen that the present invention provides a substantially improved integrated valve system which can perform all four of the desired functions (i.e., check; HPRV; POR; and bypass) in a manner which overcomes the problems described in the BACKGROUND OF THE DISCLOSURE.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. In a variable displacement hydrostatic pump including a housing and adapted to supply pressurized fluid to a high pressure conduit in fluid communication with an outlet of said pump; a source of relatively low pressure make-up fluid adapted for fluid communication with a low pressure conduit in fluid communication with an inlet of said pump; a fluid pressure operated means to vary the displacement of said pump; an integrated valve system disposed in a bore in said housing, said bore being in open fluid communication with said source of low pressure at a first location defining a poppet seat, and with said fluid pressure operated means at a second location, and with said high pressure conduit at a third location, intermediate said first and second locations; said integrated valve system including a relief and check valve subassembly, including a check valve poppet, normally seated against said poppet seat at said first location, a pressure override (POR) valve member operable in response to a pressure in said high pressure conduit in excess of a predetermined POR setting to communicate fluid from said third location to said second location, and a bypass actuator disposed at least partly external to said housing and operable, in response to manual actuation thereof, to move said check valve poppet away from said poppet seat and permit unrestricted fluid communication between said third location and said first location; characterized by:

(a) said bypass actuator including an elongated portion disposed between said relief and check valve subassembly, and a manual actuation portion disposed external to said housing, whereby axial movement of said manual actuation portion results in corresponding axial movement of said relief and check valve subassembly;

(b) said integrated valve system including a housing member fixed within said bore and defining a POR port operable to permit fluid communication from said third location to said second location, and said POR valve member being disposed adjacent said elongated portion of said bypass actuator, said POR valve member being biased toward a normally-closed position (FIG. 2) blocking flow from said third location, through said POR port to said second location, and operable to open in response to fluid pressure at said third location exceeding said POR setting, biasing said POR valve member toward an open position permitting fluid flow from said third location through said POR port to said second location.

2. A variable displacement hydrostatic pump as claimed in claim 1, characterized by said POR valve member including manual adjustment means disposed external to said housing, and operable, in response to manual adjustment thereof, to vary said predetermined POR setting.

3. A variable displacement hydrostatic pump as claimed in claim 1, characterized by said relief and check valve subassembly including a relief spring which defines a high pressure relief setting, said high pressure relief setting being independent of manual adjustment of said POR valve member, and variations in said predetermined POR setting.

4. A variable displacement hydrostatic pump as claimed in claim 3, characterized by said relief and check valve subassembly comprises a seat member which serves as the seat for said relief spring, as a poppet check valve member, and as a seat for a relief poppet.

5. In a variable displacement hydrostatic pump including a housing and adapted to supply pressurized fluid to a high pressure conduit in fluid communication with an outlet of said pump; a source of relatively low pressure make-up fluid adapted for fluid communication with a low pressure conduit in fluid communication with an inlet of said pump; a fluid pressure operated means to vary the displacement of said pump; an integrated valve system disposed in a bore in said housing, said bore being in open fluid communication with said source of low pressure at a first location defining a poppet seat, and with said fluid pressure operated means at a second location, and with said high pressure conduit at a third location, intermediate said first and second locations; said integrated valve system including a relief and check valve subassembly, including a check valve poppet, normally seated against said poppet seat at said first location, a pressure override (POR) valve member operable in response to a pressure in said high pressure conduit in excess of a predetermined POR setting to communicate fluid from said third location to said second location, and a bypass actuator disposed at least partly external to said housing and operable, in response to manual actuation thereof, to move said check valve poppet away from said poppet seat and permit unrestricted fluid communication between said third location and said first location; characterized by:

(a) said bypass actuator including an elongated portion disposed between said relief and check valve subassembly, and a manual actuation portion disposed external to said housing, whereby axial movement of said manual actuation portion results in corresponding axial movement of said relief and check valve subassembly;

(b) said integrated valve system including a housing member fixed within said bore and defining a POR port operable to permit fluid communication from said third location to said second location, and said POR valve member surrounding said elongated portion of said bypass actuator, said POR valve member being biased toward a normally-closed position (FIG. 2) blocking flow from said third location, through said POR port to said second location, and a pilot stage operable to cause a pilot flow through said POR valve member in response to fluid pressure at said third location exceeding said POR setting, said pilot flow biasing said POR valve member toward an open position permitting fluid flow from said third location through said POR port to said second location.

6. A variable displacement pump as claimed in claim 5, characterized by said POR pilot stage including manual adjustment means disposed external to said housing, and operable, in response to manual adjustment thereof, to vary said predetermined POR setting.

7. A variable displacement pump as claimed in claim 6, characterized by said relief and check valve subassembly including a relief spring which defines a high pressure relief setting, said high pressure relief setting being independent of manual adjustment of said POR pilot stage, and variations in said predetermined POR setting.

* * * * *